(12) United States Patent
Greer et al.

(10) Patent No.: US 10,229,042 B2
(45) Date of Patent: Mar. 12, 2019

(54) DETECTION OF MEANINGFUL CHANGES IN CONTENT

(71) Applicant: INTERNATIONAL BUSINESS MACHINES CORPORATION, Armonk, NY (US)

(72) Inventors: Scott B. Greer, Cary, NC (US); Rosalind Toy A. Radcliffe, Durham, NC (US); Justin Z. Spadea, Durham, NC (US); Timothy W. Wilson, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/409,899

(22) Filed: Jan. 19, 2017

(65) Prior Publication Data
US 2018/0203844 A1  Jul. 19, 2018

(51) Int. Cl.
*G06F 17/27* (2006.01)
*G06F 11/36* (2006.01)
*G06F 17/22* (2006.01)

(52) U.S. Cl.
CPC ...... *G06F 11/3688* (2013.01); *G06F 17/2211* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

| 5,642,262 A | * | 6/1997 | Terrill | ............... H01L 23/5382 |
| | | | | 174/261 |
| 5,913,061 A | * | 6/1999 | Gupta | ............... G06Q 10/10 |
| | | | | 718/101 |

(Continued)

FOREIGN PATENT DOCUMENTS

SG          170694 A1     5/2011

OTHER PUBLICATIONS

Intellexer, "Document Comparison Software", Jan. 1, 2006, pp. 1-2.
(Continued)

*Primary Examiner* — Lamont M Spooner
(74) *Attorney, Agent, or Firm* — Cantor Colburn LLP; Teddi Maranzano

(57) ABSTRACT

A technique relates comparing content. A first set of content in a first document and a second set of content in a second document are normalized. The first set of content in the first document and the second set of content in the second document are tokenized. The first set of content having been tokenized and the second set of content having been tokenized are compared in order to find differences in the second set of content with respect to the first set of content. The differences are compiled in a changes map. The differences in the changes map are analyzed to determine types of the differences in the first set of content and the second set of content, and predefined differences are to be excluded. A report of the differences is generated, and the report delineates the types of the differences while excluding the predefined differences.

20 Claims, 9 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC .......................... 704/1, 9, 10; 707/706–708
See application file for complete search history.

(56) References Cited

U.S. PATENT DOCUMENTS

| | | | |
|---|---|---|---|
| 7,546,360 B2 * | 6/2009 | Chiroglazov | G06Q 10/025 705/6 |
| 7,581,212 B2 | 8/2009 | West et al. | |
| 8,151,247 B2 | 4/2012 | Wefers | |
| 8,819,634 B2 | 8/2014 | Mahler et al. | |
| 8,862,976 B1 * | 10/2014 | Fishkin | G06F 17/212 715/202 |
| 8,949,242 B1 | 2/2015 | Lin et al. | |
| 9,038,055 B2 * | 5/2015 | Mutisya | G06F 11/3688 717/172 |
| 9,959,197 B2 * | 5/2018 | Golfieri | G06F 11/3664 |
| 2003/0167446 A1 | 9/2003 | Thomas | |
| 2004/0225919 A1 * | 11/2004 | Reissman | G06F 11/3604 714/38.12 |
| 2005/0039117 A1 * | 2/2005 | Lwo | G06F 17/2211 715/234 |
| 2005/0165600 A1 | 7/2005 | Kasravi et al. | |
| 2006/0225048 A1 * | 10/2006 | Jakubiak | G06F 11/3688 717/127 |
| 2007/0006037 A1 | 1/2007 | Sargusingh et al. | |
| 2009/0157679 A1 | 6/2009 | Elias et al. | |
| 2010/0241904 A1 * | 9/2010 | Bailey | G06F 11/3692 714/38.1 |
| 2011/0126169 A1 * | 5/2011 | Moore | G06F 8/51 717/106 |
| 2011/0238633 A1 * | 9/2011 | Garandeau | G06F 17/2211 707/690 |
| 2012/0137181 A1 * | 5/2012 | Thompson | G06F 11/0778 714/48 |
| 2012/0166412 A1 * | 6/2012 | Sengamedu | G06F 17/30867 707/709 |
| 2013/0055213 A1 | 2/2013 | Weigert | |
| 2014/0006461 A1 * | 1/2014 | Estes | G06F 17/2211 707/821 |
| 2015/0193430 A1 * | 7/2015 | Yoshizaki | G06F 17/2211 715/776 |
| 2016/0232630 A1 * | 8/2016 | Admon | G06Q 50/18 |
| 2016/0275250 A1 * | 9/2016 | Park | G06F 19/324 |
| 2017/0018046 A1 * | 1/2017 | Lee | G06Q 50/18 |
| 2017/0060732 A1 * | 3/2017 | Golfieri | G06F 11/3664 |
| 2017/0228279 A1 * | 8/2017 | Mariani | G06F 11/008 |
| 2018/0157581 A1 * | 6/2018 | Beard | G06F 11/364 |

OTHER PUBLICATIONS

Wmatrix, "Wmatrix Corpus Analysis and Comparison Tool", Sep. 10, 2007, pp. 1-7.
List of IBM Patents or Patent Applications Treated as Related; (Appendix P), Filed Sep. 5, 2017; 2 pages.
Scott B. Greer et al. " Exemplary Testing of Software", U.S. Appl. No. 15/409,939, filed Jan. 19, 2017.
Inflectra, "SpiraTest", Reporting, Test Management Features, pp. 1-8.;https://www.inflectra.com/SpiraTest/Highlights/Reporting.aspx;Retrieved May 2, 2018.
Microsoft, "Automate a Test Case in Microsoft Test Manager", Visual Studio 2015, Jan. 10, 2015, pp. 1-8.
Seapine, "Test Case Management for Improved QA Visibility", Test Case Management with TestTrack, Seapine Software, Mar. 11, 2015, pp. 1-19.
SpiraTest, "Automated Testing", Test Management Features, pp. 1-7.;https//www.inflectra.com/SpiraTest/Highlights/Automated-Testing.aspx; Retrieved May 2, 2018.
SpiraTest, "Understanding Test Management Software" Test Management Features, pp. 1-8.;https://www.inflectra.com/SpiraTest/Highlights/Understanding-Test-Management-Software.aspx; Retrieved May 2, 2018.

* cited by examiner

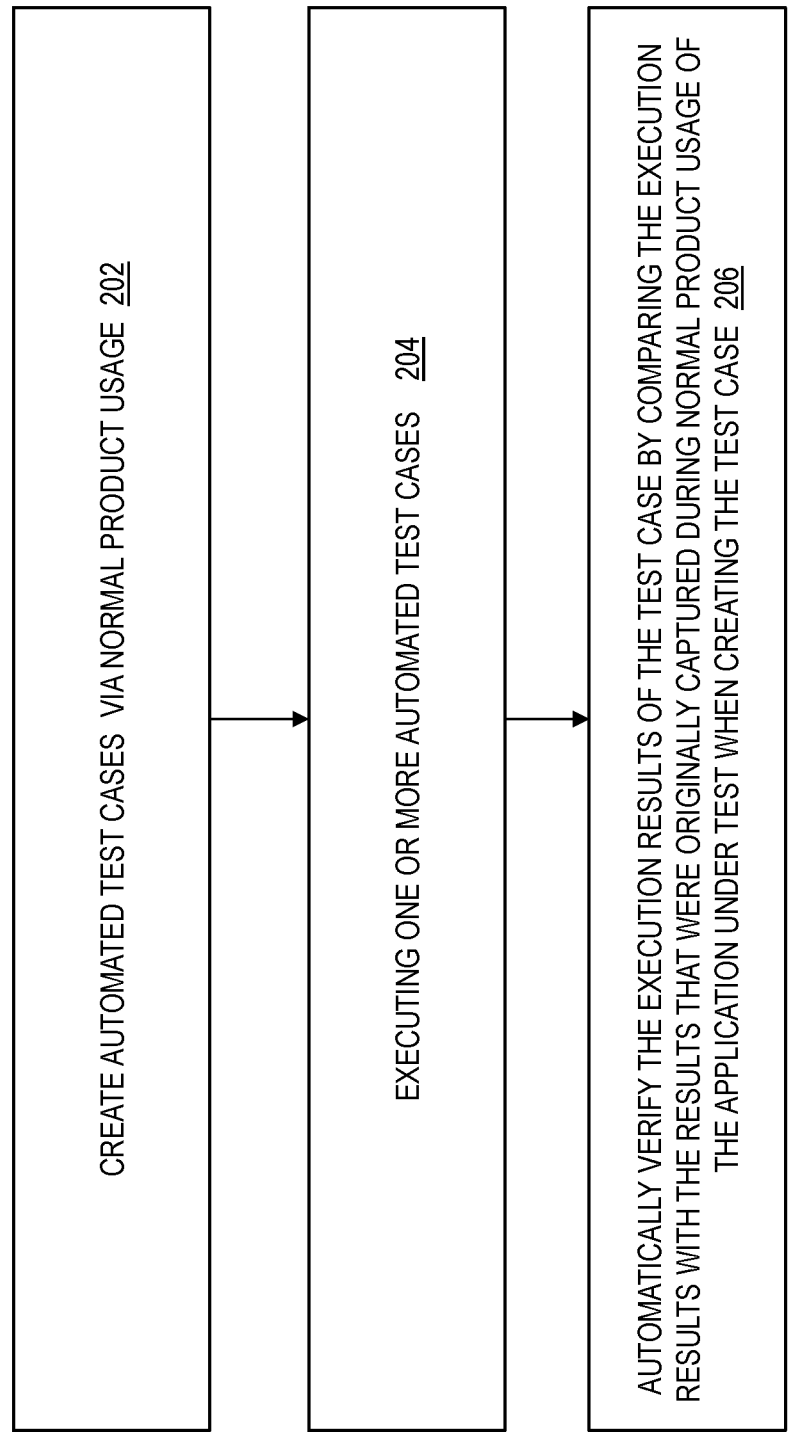

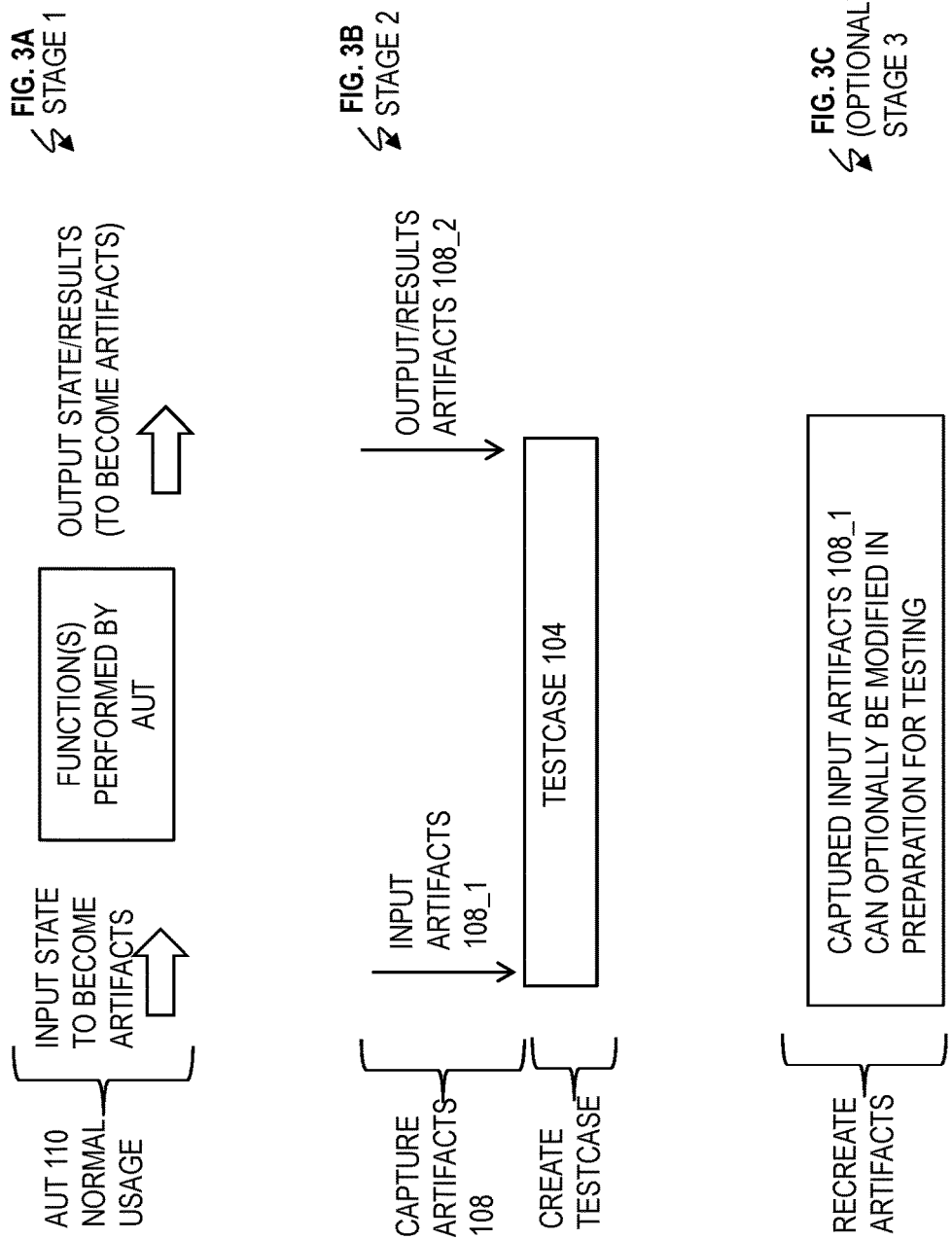

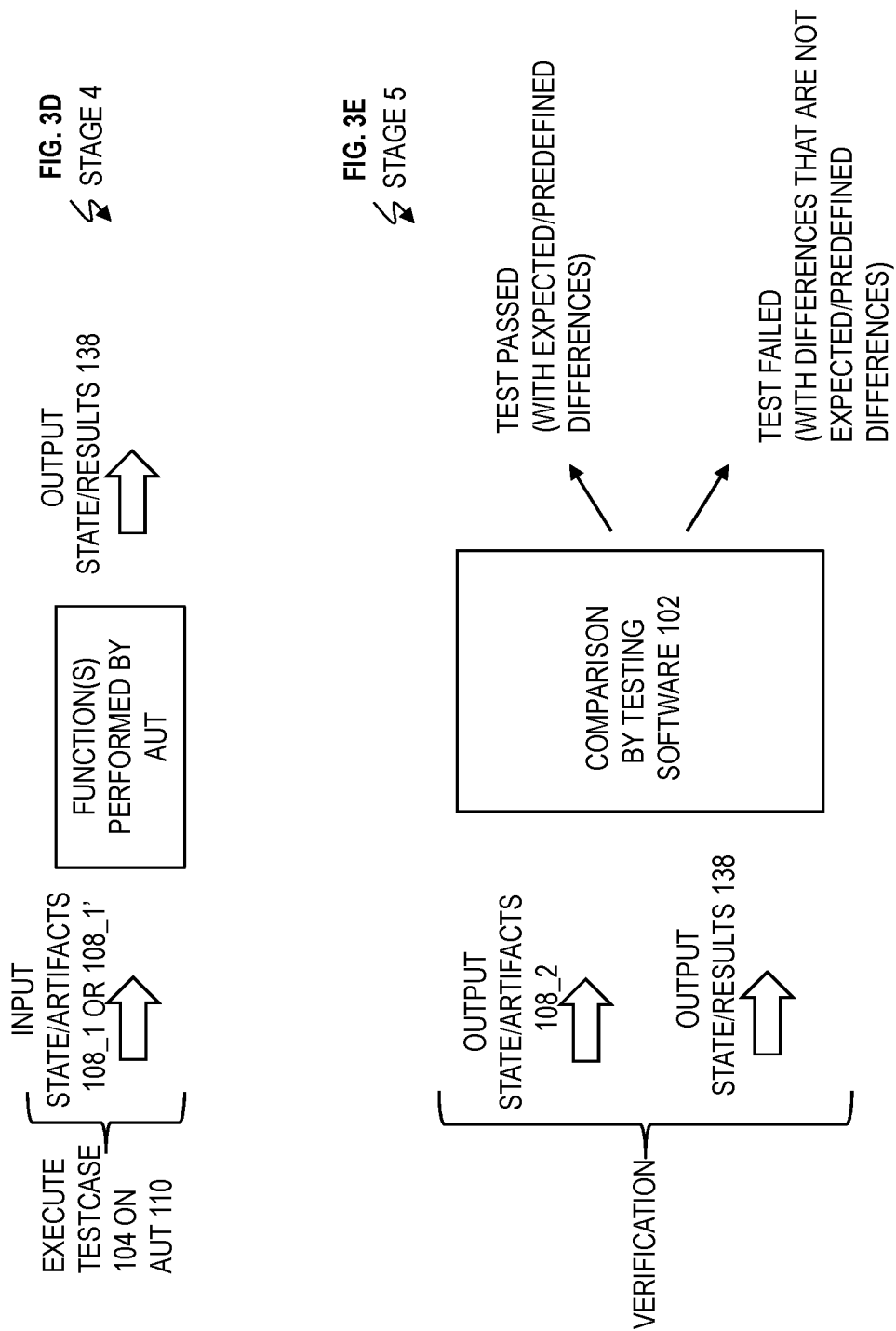

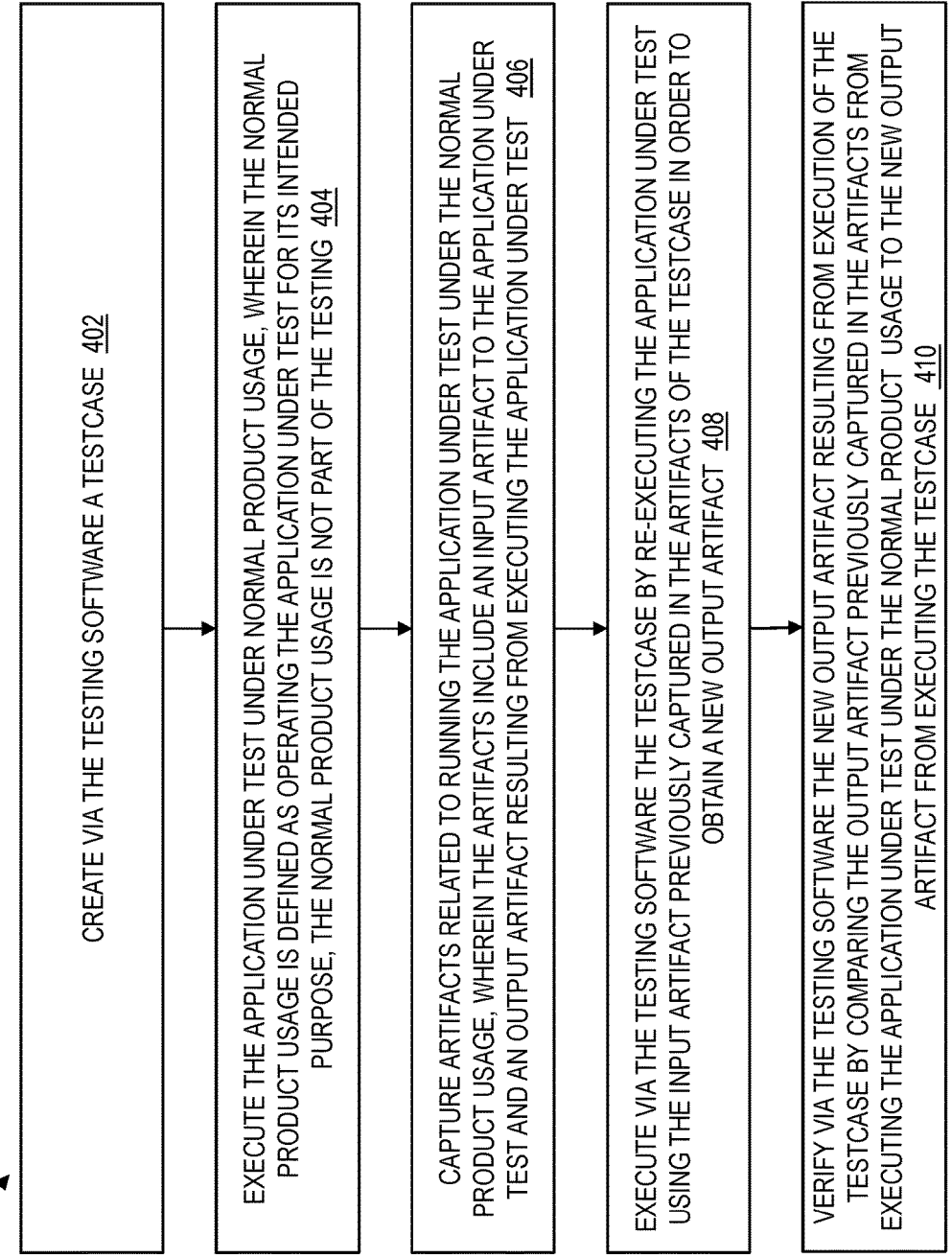

FIG. 6

600

→ NORMALIZE A FIRST SET OF CONTENT AND A SECOND SET OF CONTENT TO BE COMPARED IN THE FIRST DOCUMENT AND THE SECOND DOCUMENT  602

→ TOKENIZE THE FIRST AND SECOND SETS OF CONTENT THAT IS TO BE COMPARED  604

→ COMPARE THE FIRST AND SECOND SETS CONTENT BETWEEN THE FIRST DOCUMENT AND THE SECOND DOCUMENT TO FIND CHANGES  606

→ COLLECT ALL THE DIFFERENCES/CHANGES FOUND BETWEEN THE FIRST SET OF CONTENT IN THE FIRST DOCUMENT AND THE SECOND SET OF CONTENT IN THE SECOND DOCUMENT IN A CHANGE MAP AND ANALYZE THE CHANGE MAP  608

REPORT THE RESULTS IN THE SUMMARY REPORT  610

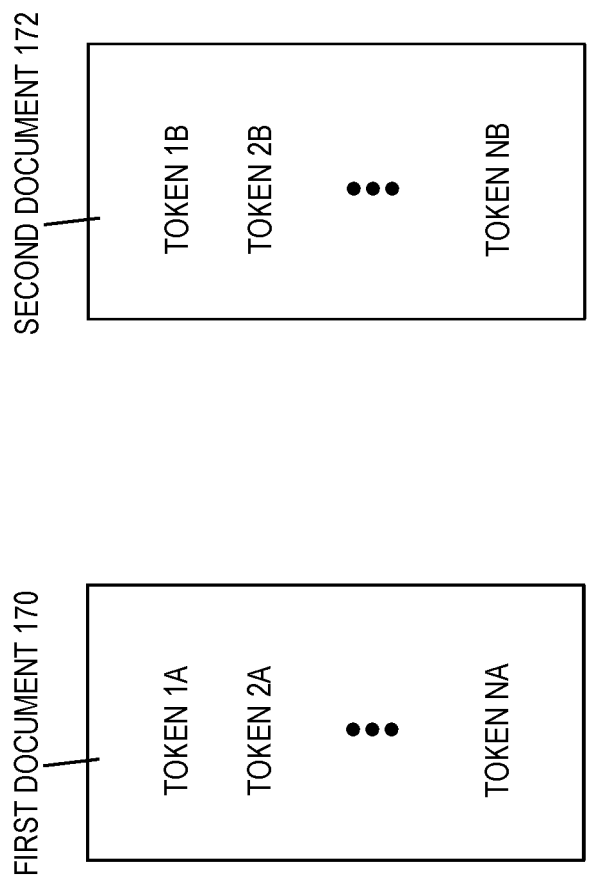

FIG. 8

SUMMARY REPORT 142

| | FIRST DOCUMENT 170 | SECOND DOCUMENT 172 | CHANGES | EXPECTED/ PREDEFINED | IGNORED | TYPE |
|---|---|---|---|---|---|---|
| 1 | TOKEN 1A | TOKEN 1B | YES | YES | YES | CHANGED |
| 2 | TOKEN 2A | TOKEN 2B | YES | NO | NO | ADDED |
| ••• | ••• | ••• | ••• | ••• | ••• | ••• |
| N | TOKEN NA | TOKEN NB | NO | N/A | N/A | EQUIVALENT |

DETECTION OF MEANINGFUL CHANGES IN CONTENT

BACKGROUND

The present invention relates in general to computing systems, and more specifically to detection of meaningful changes in content on computing systems.

Software testing is an investigation conducted to provide stakeholders with information about the quality of the product or service under test. Software testing can also provide an objective, independent view of the software to allow the business to appreciate and understand the risks of software implementation. Test techniques include the process of executing a program or application with the intent of finding software bugs (errors or other defects), and to verify that the software product is fit for use.

Software testing involves the execution of a software component or system component to evaluate one or more properties of interest. In general, these properties indicate the extent to which the component or system under test meets the requirements that guided its design and development, responds correctly to all kinds of inputs, performs its functions within an acceptable time, is sufficiently usable, can be installed and run in its intended environments, and achieves the general result its stakeholders desire.

SUMMARY

According to one or more embodiments, a computer-implemented method for comparing content is provided. The method includes normalizing a first set of content in a first document and a second set of content in a second document, tokenizing the first set of content in the first document and the second set of content in the second document, and comparing, by a processor, the first set of content having been tokenized and the second set of content having been tokenized in order to find differences in the second set of content with respect to the first set of content. The differences are compiled in a changes map. Also, the method includes analyzing, by the processor, the differences in the changes map to determine types of the differences in the first set of content and the second set of content, where predefined differences are to be excluded. Further, the method includes generating a report of the differences, where the report delineates the types of the differences while excluding the predefined differences.

According to one or more embodiments, a computer program product for comparing content is provided. The computer program product includes a computer readable storage medium having program instructions embodied therewith, and the program instructions are readable by a processor to cause the processor to perform a method. The method includes normalizing a first set of content in a first document and a second set of content in a second document, tokenizing the first set of content in the first document and the second set of content in the second document, and comparing the first set of content having been tokenized and the second set of content having been tokenized in order to find differences in the second set of content with respect to the first set of content. The differences are compiled in a changes map. Also, the method includes analyzing the differences in the changes map to determine types of the differences in the first set of content and the second set of content, where predefined differences are to be excluded. Further, the method includes generating a report of the differences, where the report delineates the types of the differences while excluding the predefined differences.

According to one or more embodiments, a system is provided. The system includes a memory including computer-executable instructions for comparing content, and a processor executing the computer-executable instructions. The computer-executable instructions cause the processor to perform operations. The operations include normalizing a first set of content in a first document and a second set of content in a second document, tokenizing the first set of content in the first document and the second set of content in the second document, and comparing the first set of content having been tokenized and the second set of content having been tokenized in order to find differences in the second set of content with respect to the first set of content. The differences are compiled in a changes map. Also, the operations include analyzing the differences in the changes map to determine types of the differences in the first set of content and the second set of content, where predefined differences are to be excluded. Further, the operations include generating a report of the differences, where the report delineates the types of the differences while excluding the predefined differences.

BRIEF DESCRIPTION OF THE DRAWINGS

FIG. 2 is a flow chart of a high-level view of testing-by-example utilizing testing software to test the application under test according to one or more embodiments.

FIGS. 3A, 3B, 3C, 3D, and 3E depict example stages of utilizing the testing software according to one or more embodiments.

FIG. 4 is a flow chart of a computer-implemented method of testing an application under test using testing software according to one or more embodiments.

FIG. 6 is a flow chart of a method of comparing content in documents to find differences/changes according to one or more embodiments.

FIG. 7 depicts an example of tokenized content in documents according to one or more embodiments.

FIG. 8 depicts an example of a summary report of differences/changes between documents according to one or more embodiments.

DETAILED DESCRIPTION

Figure 1:
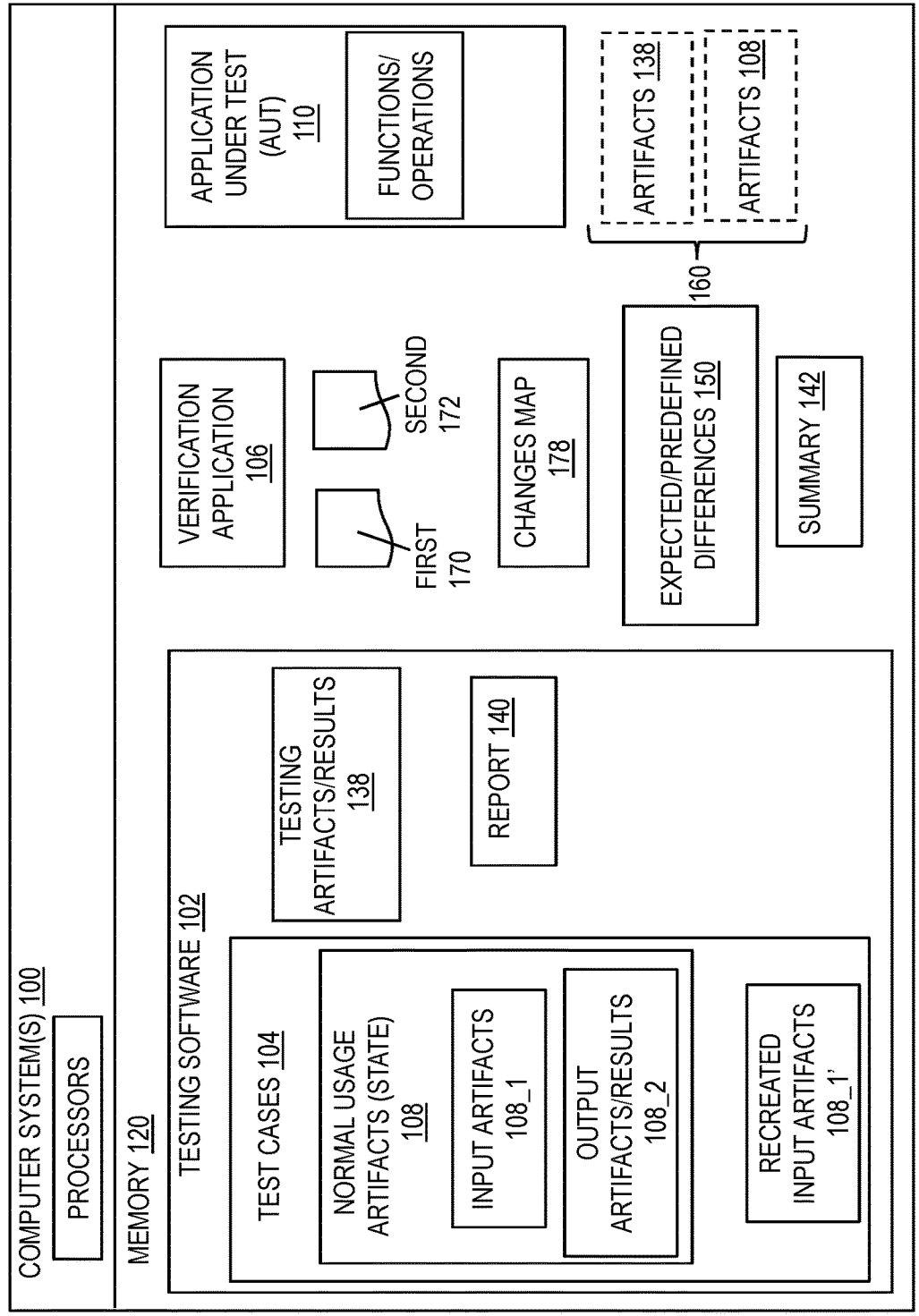
FIG. 1 depicts an example computer system according to one or more embodiments.

In the state-of-the-art, existing difference/comparison algorithms have been widely used to compare documents. One might think these comparison algorithms are both proven and mature. However, in practical usage, they fail to address key usability requirements. The problem is that classic difference algorithms answer the question of what set of character edits would be required to transform the source document into the target document. As such, this is a very low-level comparison whose results are very difficult for people to consume. For example, patterns of changes in the content as well as in the structure of the content are not obvious and must be mentally inferred by the user. There is no notion of "consistent changes", and the state-of-the-art difference algorithm is incapable of determining whether the revisions are uniformly applied among the sets of content being compared. Truly semantic differences are not obvious in an example such as, "affluent" versus "effluent", and a state-of-the-art difference algorithm would see a single character change, but the meaning is quite different. In this case, the content differs by a single edit, but this is something that would be lost in the noise of a typical difference output.

Additionally, users have to mentally ignore changes that are not interesting, such as, e.g., "1,000" and "1000" in the state-of-the-art. Difference algorithms in the state-of-the-art only compare a single pair of documents, so changes across a set of documents have to be manually compiled by the user, compounding the other issues listed above. In terms of usability, difference results are not very humane, and as such, are not typically presented directly to users. However, even modern presentations such as that seen in applications like Beyond Compare® still suffer from these underlying issues in the difference algorithm. In order to infer the things listed above, users have to manually review the results which is a very complex and cognitively challenging task.

The use cases for a more humane comparison algorithm go well beyond simply comparing logfiles. In fact, it is especially useful with any program-generated content such as that produced by compilers, exported by databases, forms, logfiles, and other types of software output. In these cases, the structure of the content is well-known and consistent but the content and the order in which it appears may vary dramatically.

According to one or more embodiments, a new form of comparison is provided in a difference/verification application. The differences/verification application is configured to answers the question, what are the semantic differences between two sets of content, and of those differences, which changes are interesting. The verification strategies application is configured to mimic the way people process and perceive changes. For example, the verification strategies application is configured to scan two different versions of a logfile, and innately skip over timestamps and other transient data. Accordingly, the verification strategies application includes an algorithm that implements a more humane comparison by ignoring irrelevant differences. According to one or more embodiments, the verification strategies application is configured to include parsers and lexers. The verification strategies application can include portions of existing difference algorithms. The verification strategies application includes RegExp (regular expression), and algorithms for computing edit distance among strings and approximate string matching.

In accordance with embodiments, the verification strategies application is a novel mechanism for iterating over arbitrary content, whether it is plain text, record-oriented, field-oriented, hierarchical, and/or any combination of those. As the verification strategies application iterates, the verification strategies application is configured to tokenize that content in order to derive a semantic representation which facilitates logical rather than simply textual comparisons. From those comparisons, the verification strategies application is configured to accumulate any differences in a change map that correlates each change with its context in the source document(s) and any corresponding deltas (i.e., changes) in the target document(s). Once the comparisons are complete for a given pair or set of documents, this change map is processed heuristically in order to identify patterns of changes as well as changes that are not interesting. The end result is a simple report summarizing the contents of the change map along with the assessment of whether the change is meaningful or can be ignored.

Now turning to the figures, FIG. 1 depicts an example computer system 100 according to one or more embodiments. The computer system 100 includes one or more processors and memory 120. The verification strategies application 106 (interchangeably referred to as the differences application), testing software 102, and a software product being tested which is the application under test (AUT) 110 may be stored in the memory 120. In another implementation, the application under test 110 and/or the verification strategies application 106 may be running in a separate computer system (not shown) operatively connected to the computer system 100, as understood by one skilled in the art. The processors are hardware configured to execute the verification strategies application 106, the testing software 102, and the application under test 110.

There are many ways to implement the verification strategies application 106. In one case, the verification strategies application 106 could be implemented as a post-processor to existing comparison algorithms. FIG. 6 is a flow chart technique for comparing content using the verification strategies application 106 according to one or more embodiments. It is noted that terms differences and changes might be utilized interchangeably.

At block 602, the verification strategies application 106 is configured to normalize the content to be compared. For example, the content can be first document 170 that is to be compared with second document 172. In one case, the first document 170 and the second document 172 can be representative of any type of content, including files, documents, etc.

The verification strategies application 106 can be a general purpose model for arbitrary content which facilitates comparisons regardless of how the content is structured. As such, this model of the verification strategies application 106 supports content whether it is plain-text, field-oriented, record-oriented, hierarchical, and/or any combination of these. Even proprietary content such as binary data could be adapted to this model. With this model, the verification strategies application 106 can iterate over the content of the first document 170 and second document 172 looking for differences. In one embodiment, all data regardless of content, type, and/or structure is translated into a generic form. Once content has been normalized into that generic form, the comparison algorithm of the verification strategies application 106 can then iterate (parse) over the content without being required to understand how the content was structured. It is appreciated that there are many ways to normalize content.

In one implementation, the verification strategies application 106 is configured to analyze and then reformat the content of the first document 170 and the second document 172 such that they have the same formatting for numbers and text. The normalization allows the content in the first document 170 and the second document 172 to have an equivalent format. For example, text normalization is the process of transforming text into a single canonical form that it might not have had before. Normalizing text before processing it allows for separation of concerns, since input is guaranteed to be consistent before operations are performed on it. Text normalization requires being aware of what type of text is to be normalized and how it is to be processed afterward. Additionally, canonicalization (sometimes standardization or normalization) is a process for converting data that has more than one possible representation into a standard, normal, or canonical form. This can be done to compare different representations for equivalence, to count the number of distinct data structures, to improve the efficiency of various algorithms by eliminating repeated calculations, or to make it possible to impose a meaningful sorting order.

At block 604, the verification strategies application 106 is configured to tokenize content that is being compared. The verification strategies application 106 is configured with an intelligent and extensible mechanism by which content can be recognized for what it is, using a mixture of patterns, regular expressions, lexers, and similar constructs. In lexical analysis, tokenization is the process of breaking a stream of text up into words, phrases, symbols, and/or other meaningful elements called tokens. The list of tokens becomes input for further processing such as parsing or text mining by the verification strategies application 106. The verification strategies application 106 is configured to perform tokenization as linguistics analysis (where it is a form of text segmentation).

For example, the verification strategies application 106 is configured to tokenize the first document 170 and the second document 172. This breaks up the content of the first document 170 and the second document 172 into tokens (or segments) such that the tokens in the first document 170 can be compared to the tokens in the second document 172. FIG. 7 depicts an example of tokenized content in the first document 170 and the second document 172. This allows token 1A in the first document 170 to be compared to token 1B in the second document 172, token 2A to be compared to token 2B, through token NA which is compared to token NB.

It should be appreciated that there are many techniques for breaking up (i.e., tokenizing) the content for comparison. For example, a tokenizer can utilize heuristics, and a few heuristics are provided for explanation purposes. Punctuation and whitespace may or may not be included in the resulting list of tokens. All contiguous strings of alphabetic characters are part of one token, and likewise with numbers. Tokens are separated by whitespace characters, such as a space or line break, and/or by punctuation characters.

At block 606, the verification strategies application 106 is configured to compare the content between the first document 170 and the second document 172 to find changes. The verification strategies application 106 makes a comparison of the second document 172 with respect to the first document 170.

For example, the tokenized content (in first document 170 and second document 172) is compared semantically, and/or in whatever manner is appropriate for the tokens. It is noted that this comparison does not need to be performed strictly at the token level. In one implementation, the verification strategies application 106 is configured to recognize differences and merge a series of differences (between the first document 170 and the second document 172) among consecutive tokens where appropriate.

Further, the verification strategies application 106 is configured to find changes/differences in arbitrary types of content, even across multiple documents. Although only the first document 170 and the second document 172 are illustrated for ease of understanding, it should be appreciated that the verification strategies application 106 is configured to find changes among first, second, third, etc., documents being concurrently compared. In one implementation, the verification strategies application 106 is configured to identify differences by using an abstract representation of content, and using the abstract representation allows for different types of data to be compared. Since the content of the first document 170 is normalized, this facilitates comparison. As such, common types of contents and documents may be supported directly by the implementation, and arbitrary types of content can be easily supported through various well-known mechanisms.

At block 608, the verification strategies application 106 is configured to collect the differences/changes found between the first document 170 in a change map 178, and then analyze the change map 178. Having compiled the full set of changes among all of the content being compared (in the first document 170 and second document 172), the verification strategies application 106 is configured with strategies and heuristics in order to recognize and characterize the deltas. Deltas are the changes/differences in content between the first document 170 and the second documents 172. In some cases, a set of heuristics can provide very usable and insightful results, and the heuristics of the verification strategies application 106 can include any of the following:

1) If a change occurs exactly once, the verification strategies application 106 is configured to determine that the change (occurring only once) is meaningful.

2) If a change occurs in multiple places, and all of the "target" differences are the same, then the verification strategies application 106 is configured to determine that this a change that is consistently applied. This change that is consistently applied is reported as a change, albeit one that is uninteresting in some cases. Conversely, if there are multiple differences in one or more target contexts, then the verification strategies application 106 is configured to determine that it has found significant differences. The comparison algorithm of the verification strategies application 106 is concerned with iterating over one set of "old" contents in order to find differences in "new" versions of that same content, and accordingly, "target contexts" means the new versions of the content.

3) The verification strategies application 106 is configured to factor the nature of the change into these heuristics. The tokenized content can itself decide whether the change is significant, i.e., numbers compare differently than text does. For example, the verification strategies application 106 is configured to recognize different types of content and therefore compare the content appropriately, such that, e.g., strings, numbers, dates, etc., can all be compared semantically.

4) The verification strategies application 106 is configured to identify structural changes in order to find patterns inherent in the change. For example, patterns in the changes (between the first document 170 and the second document 172) will typically show up in the change map 178 as a single consistent change (such as a one-to-many cardinality) and the actual contents of the first document 170 and second document 172 will typically consist mostly of non-alphanumeric characters. It is noted that this same heuristic applies to different types of changes, because structural changes will also typically consist of a repeated pattern of adds, changes, and deletes found between the first document 170 and the second document 172.

As noted above, the verification strategies application 106 is configured to correlate differences in the change map 178. Given one or more documents (or other logical containers of content) such as, for example, the first document 170 and the second document 172, the verification strategies application 106 is configured to accumulate the changes the change map 178. For each change, the change map 178 records the content from the source document (e.g., second document 172) along with the context in which the change occurs in the second document 172 with respect to the content in the first document 170; each change is then associated with the corresponding differences and the contexts in which they occur. In one case, the context in which the change occurs refers to the location in which the change occurs in the old and/or new version of the content. Typically, it might include the file, line number, character position, etc., but those are only examples of the kind of information that comprise the context of a change.

The first document 170 and the second document 172 each have content and this content is the actual source elements from the respective documents. The source element can be a line of software code, a line in a file, etc. Deriving the change map 178 enables a detailed correlation of the source elements to their corresponding differences. This means that the change map 178 includes line 1 (as source elements) of the first document 170, line 1 (as source elements) of the second document 172, and the identified type of difference between the line 1 of the first document 170 versus the line 1 of the second document 172. As such, the change map 178 represents a holistic view of the revisions since the change map 178 spans the entire set of contents being compared in first document 170 and second document 172. This is an improvement on existing state-of-the-art algorithms, because the change map 178 allows verification strategies application 106 to identify the nature of the changes as well as identify patterns among changes. The change map 178 is particularly useful when comparing sets of content, rather than simply a pair of documents.

Further, the verification strategies application 106 is configured to identify meaningful differences and ignorable differences within the change map 178. Meaningful differences are to be presented in the summary report 142 discussed below. In one implementation, the ignorable differences are excluded from the summary report 142. In another implementation, the ignorable differences can be included in the summary report 142 with an indication such as a flag, asterisk, and/or mark to show that the ignorable differences can be skipped. Further, the verification strategies application 106 has an option for the user to select to include the ignorable differences and/or to exclude the ignorable differences from the summary report 142.

Having completed the comparisons and obtained the change map 178, the verification strategies application 106 employs a number of strategies to classify the changes as meaningful or irrelevant/ignorable. It should be appreciated that the strategies utilized may vary according to a given implementation or a given invocation of the algorithm. Regardless of the actual strategies used, the verification strategies application 106 is configured to classify the nature of the changes found in the change map 178. Examples of the strategies which may be used include the following:

1) The verification strategies application 106 is configured to recognize patterns of changes from the change map 178. The verification strategies application 106 is configured to identify changes that are consistently applied, such as "<timestamp_1>" in the first document 170 correlating in multiple places with "<timestamp_2>" in the second document 172. The verification strategies application 106 can recognize this pattern of change. In one implementation, the verification strategies application 106 is configured check if this pattern of change is one of the expected/predefined differences 150, and the verification strategies application 106 can ignore (i.e., exclude) the pattern of change.

2) The verification strategies application 106 is configured to identify structural changes by their repetitive nature. For example, there can be the case of some content encoded in two different formats such as XML and JSON. By examining the change map 178, verification strategies application 106 can determine a very strong correlation between the syntax of the two formats. For example, the comparison algorithm of the verification strategies application 106 can intelligently handle content in terms of its structure. If the verification strategies application 106 needed to compare the XML version of a document with the same contents expressed in a JSON document, the verification strategies application 106 is configured to overlook the syntax specific to each format.

3) The verification strategies application 106 is configured to identify ignorable content by using regular expressions, custom lexers, and/or dictionaries. In some applications of the algorithm, employing the regular expressions, custom lexers, and/or dictionaries can also be used to mask out transient content that is of no interest. Examples of transient content can include timestamps, UUIDs, and other transient data. However, in one implementation, it is noted that masking may not be necessary because verification strategies application 106 is configured to identify these as "consistent changes" as noted above, and the verification strategies application 106 is configured to find that <UUID_A> in the first document 170 correlates exclusively with <UUID_1> in the second document 172. The verification strategies application 106 is configured to exclude this transient content from the summary report 142.

4) Learning can be employed by training the system on a set of content whose differences are not interesting (i.e., the type of differences that are to be excluded). The resulting change map 178 can be saved for future comparisons such that the known changes can be ignored.

5) Depending on the nature of the changes, verification strategies application 106 is configured to adapt its findings to best fit the application and the user's goals. For example, in a lot of use cases, structural changes are essentially syntactic noise, and therefore users will want to overlook those changes. Accordingly, verification strategies application 106 is configured to with user options in which the user can select to ignore/exclude structural changes from being presented in the summary report 142, when the verification strategies application 106 identifies structural changes.

Similarly, the verification strategies application 106 is configured to optionally employ various weights to these strategies in order to characterize the significance of each given change. The use of weights can be complemented by policy-based comparisons, in which the user has even finer control over the algorithm of the verification strategies application 106. In some use cases, certain types of changes may be more or less interesting. For example, sometimes when comparing different versions of a document (such as first document 170 and second document 172), users might wish to focus only on the actual revisions and would therefore want to ignore any additions in the newer document (e.g., the second document 172). With existing tooling in the state-of-the art, one would have to manually try to ignore certain types of results at the risk of overlooking something of interest. However, verification strategies application 106 is configured to with user options that allow the user to indicate which type(s) of changes he is interested in, and can optionally employ various filters and criteria to the results in order to obtain a change report 142 that exactly meets their objectives.

Continuing with FIG. 6, at block 610, the verification strategies application 106 is configured to report the results in the summary report 142. From the results of the difference/changes found from the comparison, the verification strategies application 106 is configured to generate a readable report of the differences, where the differences (between the first document 170 and the second document 172)

are organized in terms of their overall significance. In one implementation, the differences are presented in order of most-to-least meaningful, factoring any configuration of the algorithm the user may have done (such as to indicate that structural changes are not interesting/meaningful).

In one or more embodiments, the verification strategies application 106 is configured to with a learning mode. In the learning mode, the algorithm of the verification strategies application 106 can be trained by performing a comparison and remembering the differences as changes to be expected in future comparisons. These differences/changes can be the type that are expected/predefined differences 150, and the expected/predefined differences 150 are to be ignored by the verification strategies application 106. The verification strategies application 106 can exclude/remove these expected/predefined differences 150 (when found between the first document 170 and the second document 172) from the changes map 178 and/or summary report 142. FIG. 8 is an example of a summary report 142.

The model of the verification strategies application 106 covers data regardless of its structure. The verification strategies application 106 is configured to produce the summary report 142 listing each content element and whether it is equivalent, added, changed, or deleted. In addition, since the actual comparisons are token-oriented, these tokens are inferred using a number of strategies, including natural language processing, so that content is compared on a logical semantic level rather than simply comparing the bytes and characters of a given representation. This approach is an improvement over conventional approaches in the state-of-the-art because the state-of-the-art can suffer when comparing simple record-oriented content and fail to support hierarchical content.

A computer-implemented method for comparing content includes normalizing a first set of content in a first document 170 and a second set of content in a second document 172, tokenizing the first set of content in the first document and the second set of content in the second document, and comparing, by a processor, the first set of content having been tokenized and the second set of content having been tokenized in order to find differences in the second set of content with respect to the first set of content, wherein the differences are compiled in a changes map 178. The method also includes analyzing, by the processor, the differences in the changes map 178 to determine types of the differences in the first set of content and the second set of content, wherein predefined differences 150 are to be excluded. The method includes generating a report 142 of the differences, wherein the report delineates the types of the differences while excluding the predefined differences 150.

The processor is configured to find transient changes in the changes map 178, wherein the transient changes are recognized as the predefined differences to be excluded. The transient changes are defined as items that are intended to increment or decrement as an intended operation. The transient changes are selected from the group consisting of differences in dates, differences in hostnames, differences in TCP/IP addresses, differences in universally unique identifiers (UUIDs), and differences in a number of lines in a logfile. The processor is configured to identify a pattern of changes that are repeatedly applied. The processor is configured to determine that the pattern of changes is to be excluded from the report 142. The processor is configured to identify a structural change and the processor is configured to exclude the structure change from the report 142.

There are many reasons why it is useful to compare two different sets of program-generated content. Software testing is perhaps the most obvious. Comparing the content as generated by two different versions of the software can be important in validating program logic, detecting regressions, and triaging issues. Users can also benefit from this comparison in order to understand the revisions or to recover data from different points in time. For explanation purposes, a scenario is provided below with respect to software testing, but it is understood that the verification strategies application 106 is not meant to be limited to software testing.

One or more embodiments can be understood with a concept that testing-by-example via the testing software 102 is configured to create automated testcases 104 just by using the application under test 110 through normal usage for its intended purpose. As a high-level overview, FIG. 2 is a flow chart 200 of testing-by-example utilizing the testing software 102 to test the application under test 110 according to one or more embodiments. FIGS. 3A, 3B, 3C, 3D, and 3E depict example stages of utilizing the testing software 102 according to one or more embodiments.

At block 202, the testing software 102 running on the processor is configured to create automated testcases 104 as via normal product usage of the application under test 110. The application under test 110 is executed under normal usage as depicted in stage 1 in FIG. 3A. The developed use of the application under test 110 can be for any intended purpose, such as to convert a Word document to a PDF, to play a video, to play music, to compress a file, to decompress a file, etc. Through normal product usage of the application under test 110, the testing software 102 stores normal usage artifacts 108 of the application under test 110 as the state of the application under test 110, as depicted in state 2 in FIG. 3B. The normal usage artifacts 108 can be designated as input artifacts 108_1 that are utilized as the input into the application under test 110 and designated as output artifacts/results 108_2 that are the results/output/publication from the execution of the application under test 110 during normal usage. The testing software 102 is configured to save the state of the application under test 110 before, during, and after execution of the application under test 110 as artifacts 108, thereby create that testcase 104 as depicted in stage 2 in FIG. 3B. Normal product usage is defined as operating/executing the application under test 110 to perform its intended purpose for which the application under test 110 was developed/designed to perform. In other words, normal product usage is exercising the application under test 110 as intended by end users in expected usage scenarios. However, examples that are not normal usage (i.e., non-normal usage) of the application under test can include performance testing, translation testing, etc.

Optionally, the testing software 102 can recreate the artifacts 108 (e.g., input artifacts 108_1) as recreated input artifacts 108_1, as depicted in stage 3 in FIG. 3C. Particularly, recreate means to take any necessary steps to reconstitute the artifacts so that they are "live" again in the application under test 110. For example, if the application under test 110 consists of a server which uses a database, capture means extracting the artifacts stored in that database. Later, when the tester executes a testcase 104 using those artifacts, the execution is typically against a test system perhaps consisting of a freshly installed server, so the purpose of recreating for this application under test 110 is to populate that server's database with the same information that was captured originally.

At block 204, the testing software 102 is configured to execute the automated testcase 104 and save the testing artifacts/results 138, as depicted in stage 4 in FIG. 3D. The testing software 102 is configured to run the testcase(s) 104 on the application under test 110 using the artifacts 108 as input, because the artifacts 108 were originally utilized as the input (e.g., input artifacts 108_1) to run the application under test 110 in previous block 202 and in previous stage 1 in FIG. 3A. For example, testcase execution consists of a number of steps. For each step of the testcases 104, the artifacts 108 are recreated (or updated) accordingly. Then, the command, operation, and/or method associated with this step are invoked in the application under test 110. When the operation completes, the associated artifacts are captured in order to obtain the execution results 138 for this step of the testcase 138. They can then be compared using verification strategies application 106 as herein.

At block 206, using the verification strategies application 106, the testing software 102 is configured automatically verify the results (which are denoted as testing artifacts/results 138) from the testcase 104 by comparing the execution artifact/results 138 with the output artifacts/results 108_2 that were originally captured during normal usage of the application under test 110 when creating the testcase 104, as depicted in stage 5 in FIG. 3E.

The testing software 102 is a more humane approach to test automation. Rather than build, integrate, and/or maintain a complex test automation infrastructure, anyone familiar with the application under test 110 can create an automated testcase 104, such as testers, developers, and even customers. For example, a software developer could "unit-test" a new feature or behavior of the application under test 110, and then capture that as an automated testcase 104 via the testing software 102. A customer could report a bug by capturing a testcase 104 which could then be used by the development team to recreate the bug and then subsequently used in automated regression testing. Compared to existing approaches in the state-of-the-art, the testing software 102 is much more results-oriented. The testing software 102 avoids the high cost and inherent fragility of programmatic testing. Also, the testing software 102 avoids the overly fine-grained recording that makes cinematic testing so problematic. Rather than record a series of mouse-events and key-events that comprise a scenario, testing software 102 captures the before-state and after-state of the application under test 110 relative to the invocation of some significant behavior or behaviors.

Further discussion is regarding the creation of executable testcases 104 through normal product usage of the application under test 110. Rather than rely on arcane testing tools, testers create testcases 104 simply by exercising the application under test 110 according to one or more embodiments. Application artifacts 108 created as a result of normal usage are "captured" for subsequent use in recreating those artifacts 108. The artifacts 108 include input artifacts, the command/function that is invoked in the application under test 110, and the output artifacts. Focusing on artifacts 108 allows the testcase 104 to reflect the state of the application under test 110 (system) at the time of the capture, and this means that testcases 104 can be easily shared among other team members (such as testers). By capturing artifacts 108, testing-by-example of the testing software 102 obviates the messy and costly test logic associated with state-of-the-art approaches. These artifacts 108 may be captured by a wide variety of means, including the use of general-purpose mechanisms which extract artifacts 108 from filesystems, from databases, from system APIs, from interchange formats (such as XML (eXtensible Markup Language), JSON (JavaScript Object Notation), and standardized protocols such as web services), etc. If none of those are appropriate, these artifacts 108 may be extracted using existing APIs. In one case, a small amount of custom code for capturing the artifacts 108 may be utilized but this is still far superior to existing approaches because the custom code (of the testing software 102) is so lightweight and quite stable because the logic is so narrowly focused on capturing and recreating the artifacts, it almost never changes even as the application under test 110 is free to evolve.

Since this capture of artifacts 108 includes inputs (e.g., input artifacts 108_1) as well as outputs (output artifacts/results 108_2), the resulting testcase 104 reflects the initial state of the application under test 110 before some amount of function was invoked, along with the associated outputs after the function(s) of the application under test 110 has been executed. This provides example-by-testing in the testing software 102 with everything it needs to a) recreate the test and b) verify the results. Example artifacts 108 can include build results, build engine, project area, a snapshot of connects, change history, activities, downloads, logs/logfiles, etc. To capture the artifacts 108, the testing software 102 is configured to utilize APIs, extensions, services, databases, file systems, etc., such that the testing software 102 interacts with the application under test 110 before and after the normal usage.

Note that the artifacts 108 can be captured aggressively. For example, in the case of dependency builds, the experimenters found it useful to capture the build and everything remotely related to it as the artifacts 108. It should be noted that with this testing methodology, capture can aggressively collect as much information as possible about the artifacts 108 and the overall state of the system at the time of capture. For example, the testing software 102 might collect information about the computer system 100 on which the testcase 104 was captured. Although this captured information is not directly related to the testcase 104, however, it can be useful either to the tester or in future versions of that testcase 104 as the testing evolves. This allows for considerable "future-proofing" of the captured example-by-testing (i.e., in the testcase 104) because the captured artifacts 108 ensure execution of the testing software 102 (which is to run the application under test 110) will always have everything it might need. Furthermore, capturing information related to the artifacts 108 can include any amount of auxiliary or secondary information that is available to the test framework, so that the testing software 102 can include details about the computer system 100 on which the capture took place, such as operating system, memory and hard drive capacities, etc. In subsequently executing the testcase 104, some of that information may not be useful, but it might optionally be used by testers who wish to avoid executing testcases that meet certain criteria. For example, avoiding a testcase that was captured on an 8 gigabyte (GB) Windows® system when running that testcase on a 4 GB Linux® system.

The testing software 102 provides creation and execution of testcases 104 using infrastructure decoupled from the application under test 110 (i.e., being tested).

Another distinctive characteristic of example-by-testing of the testing software 102 is that it the minimal infrastructure required can actually be applied to a wide variety of applications under test 110. The testing software 102 has been built as a testing framework which provides the basic mechanisms for capturing and recreating application artifacts 108 along with the logic for executing tests and verifying the results.

During capture, given a particular artifact 108 (or set of artifacts 108), the testing software 102 is configured to store the artifacts 108 and everything related to it. The result is an executable testcase 104 that is automated such that the testcase 104 is configured to automatically execute on the application under test 110 just as though the application under test 110 is running under normal usage. As such, the testing software 102 is configured to capture inputs artifacts 108_1 (including the state of all artifacts at the beginning of the testcase 104) as well as all of the output artifacts 108_2 (including the state of any artifacts at the end of the testcase 104). The artifacts 108 of testing software 102 include any commands that are used to trigger the application under test 110 so that the testing software 102 processes the inputs (artifacts 108_1) and produces the outputs (testing artifacts/results 138). With example-by-testing, this is typically a very high-level command. In most cases, any such commands are captured (as artifacts 108) (and recreated) like any other artifacts. The commands captured as artifacts 108 can be instructions to cause/invoke the application under test 110 to perform its one or more functions that the application under test 110 is intended to perform.

The testing software 102 is configured to recreate the (input) state of the application under test 110, which is the opposite of capture in which recreating takes previously stored artifacts 108 and reconstitutes them appropriately to run on the application under test 110. Normally, this recreate operation of the testing software 102 is not required to be done by the user explicitly.

During execution of the application under test 110 for testing, for a given testcase 104 that was previously captured and created when running the application under test 110 during normal usage, the testing software 102 does several things in order to run the testcase 104 using the stored normal usage artifacts 108 and verify the results (output artifacts/results 108_2). The testing software 102 is configured to implicitly recreate all of the artifacts 108 associated with the testcase 104, such as by recreating them as recreated artifacts 108_1' in one implementation. In another implementation, the testing software 102 does not have to recreate the artifacts. The testing software 102 is configured to optionally issue zero or more application commands (to the application under test 110) in order to initiate the behavior associated with the testcase 104. As discussed herein, a "command" covers whatever piece logic that the application under test 110 needs to be invoked. For example, the command can be an API, a web service, a REST service, a Java method, etc. The command is included as part of the capture by the testing software 102 such that such that the testing software 102 stored enough detail in order to execute this step of the testcase 104. Accordingly, the testing software 102 is configured to know how to invoke the command correctly. During execution (e.g. of the command), the testing software 102 is configured to wait for the testing results 138 from re-running the application under test 110 using the testcase 104 (which includes artifacts 108, particularly the input artifacts 108_1 which may be recreated artifacts 108_1), and then the testing software 102 is configured to perform an implicit capture of the execution results 138. Having obtained the execution results 138 in a generic fashion, the testing software 102 is configured to compare those results 138 to those results 108 (e.g., output artifacts/results 108_2) obtained by the original capture. As noted above, the original capture is when application under test 110 is executed under normal usage (in which it worked properly as intended) to create the testcase 104.

As verification that the original output artifacts/results 108_2 match/compare to the testing artifacts/results 138 (with expected or predefined differences 150), the testing software 102 is configured to perform this comparison using a novel algorithm, e.g., verification strategies application 106 as discussed further herein. Testing software 102 is configured to utilize the verification strategies application 106 to determine if the application under test 110 passed or failed the test. To pass, the testing software 102 determines that the artifacts/results 108_2 gathered during the normal usage of the application under test 110 (when the testcase 104 was created) matches the artifacts/results 138 generated when the testcase 104 is run on the application under test 110. For the passed test, matching means that the output artifacts/results 108_2 and the artifacts/results 138 are the same while ignoring the expected/predefined differences 150 discussed herein. To fail, the testing software 102 determines that the artifacts/results 108_2 gathered during the normal usage of the application under test 110 (when the testcase 104 was created) do not match the artifacts/results 138 generated when the testcase 104 is run on the application under test 110.

Given these capabilities of the testing software 102, the result is a minimalist but very capable infrastructure which can be used to do testing-by-example for a wide variety of different types of applications under test 110. The testing software 102 can be built as an exemplary testing framework which provides the basic mechanisms for capturing and recreating application artifacts along with the logic for executing tests and verifying the results.

As experimenters have proven with the implementation of exemplary testing software 102, this approach means that the test automation logic requires little-to-no coupling with the application under test 110 being tested. The application under test 110 is free to evolve independently of the test automation of the testing software 102, and the test automation can be implemented and improved independently of the application under test 110. Moreover, the application under test 110 does not contain any of the test framework of the testing software 102 because none of the elements of the testing software 102 needs to be embedded in the application under test 110 nor does the application under test 110 invoke any logic within the testing software 102. In fact, an application under test 110 does not even need to know the testing software 102 exists at all.

Turning to automatic verification of test results 138, the verification strategies application 106 is configured to verify the testing artifacts/results to determine that the testcase 104 passed or failed the test. Whether generic or application specific, the semantics of capturing the artifacts 108 for a given application under test 110 provide the ability to capture testcases 104 along with the means to verify subsequent execution of the captured testcases 104. By intelligently comparing the artifacts 108 at the time of capture to those artifacts 138 captured after the test execution of the testcase 104, the verification strategies application 106 is then able to verify the execution results 138 as being accurate or a match. Doing this correctly requires the use of the comparison algorithm in the verification strategies application 106 in order to automatically ignore expected differences 150 in the execution result 138 in contrast to the artifacts 108 (particularly the output artifacts/results 108_2). These predefined differences 150 can include transient things/items like dates, hostnames, Transmission Control Protocol/Internet Protocol (TCP/IP) addresses, universally unique identifiers (UUIDs), etc., and as such should be ignored when determining whether the test passed or failed. It also means the verification strategies application 106 is configured to intelligently ignore things/items which are present in the execution results 138 but not in the original artifacts/result 108. For example, additional lines in a logfile are likely to appear in the testing artifacts/results 138 as the application under test 110 evolves (while not in the original artifacts/results 108) but the presence of the additional lines in the logfile are ignored during the comparison and do not result in a fail when comparing the results. Also, the verification strategies application 106 is configured to look/parse for "consistent changes" in testing artifacts/results 138 that are not in the output artifacts 108 (particularly output artifacts 108_2) and these consistent changes do not result in a fail. The verification strategies application 106 is configured to determine that these consistent changes follow a pattern, and this pattern of consistent changes are ignored by the verification strategies application 106 when determining pass or fail. For example, the verification strategies application 106 is configured to check and ensure that all occurrences of UUID1 in the captured artifact 108 correspond with or match UUID2 in the testing results/artifact 138 during test execution. Accordingly, this difference between UUID1 in the captured artifact 108 versus UUID2 in the testing artifacts/results 138 is ignored through the artifacts 108 and 138 and does not create a fail.

It should be appreciated that the verification strategies application 106 can compare 10-12 files of varying content and structure. For each of those files, there is an "old" version (such as the first document 170 or the artifacts 108 (particularly output artifacts 108_1)) that comes from the testcase 104 and a "new" version (such as the second document 172 or the artifacts 138) that comes from the execution results of the testcase 104. Although each file is compared in terms of its old and new versions, the verification strategies application 106 accumulates all of those changes across all the documents in its change map 178.

Using the verification strategies application 106 enables testing-by-example to produce a human-like and very easy-to-understand report of any meaningful differences between the original results 108 and those results 138 expected by the testcase 104. The testing software 102 can report a summary of the comparisons which can include predefined differences 150 that are ignored and any difference that are not ignored. The testing software 102 can also report a differences report 140 of the failing differences that are found when these differences are not the expected/predefined differences 150. The verification strategies application 106 is a beneficial part of example-by-testing because when the testing software 102 captures the output as part of the artifacts 108 comprising the testcase 104, the verification strategies application 106 now knows what to expect whenever it subsequently executes that testcase 104. Testers do not need to define the expected results 138 in any way, as this is something that would be fragile and tedious. As a simple example, if a tester invokes a given function of the application under test 110 with a set of inputs and the application under test 110 returns the number "3", all of this information is captured in the testcase 104 as artifacts 108. Later, when the tester executes that testcase 104, the verification strategies application 106 expects the application under test 110 to return the same output which is in this case, the number "3". Further, in real-world testcases 104, the output can be much more complex. In the case of the dependency build implementation, the output of each build consists of 10-12 files of varying formats and contents. The verification strategies application 106 is configured to compare those files in the captured testcase 104 with their equivalents in the execution results 138 so that the verification strategies application 106 (and/or testing software 102) can determine whether the testcase 104 passed or failed and if it failed, why.

It should be appreciated that verification should be reliable, accurate, and intelligent. There are of course many possible implementations. However, an example approach is provided to illustrate verification. Verification utilizing the verification strategies application 106 provides the following: 1) a general-purpose comparison of arbitrary documents regardless of their structure and content, 2) a robust set of strategies for ignoring irrelevant data, 3) "training" mechanisms by which it can learn to recognize expected changes, and 4) a policy-driven comparison that recognizes consistent differences (i.e., meaning that the testing software 102 can ensure that occurrences of UUID1 correspond to occurrences of UUID2 in the revised document with producing a test fail).

Any combination of these can be utilized in the automatic verification of verification strategies application 106. This verification can be in two ways. First, by invoking verification strategies application 106 on the output artifacts 108_2 as they were captured in order to compare them (i.e., compare output artifacts 108_2 to output artifacts 138) after the test of the testcase 104 was executed, the testing software 102 can determine whether the test passed or failed. If the test of the testcase 104 failed, the testing software 102 can provide some indication of why by using a differences report 140 to indicate the discrepancies. In this case, the differences between output artifacts 108_2 and output artifacts 138 are unexpected therefore causing the test of the testcase 104 running on the application under test 110 to fail. Second, to make verification logic of the verification strategies application 106 more robust, immediately after an object is recreated (i.e., an input artifact of the input artifacts 108_1 is put in a condition to be utilized as input for the testcase 104) during test execution of the testcase 104 on the application under test 110, the testing software 102 can silently capture that new object (i.e., the recreated input artifact). The testing software 102 can then compare the recreated object (i.e., recreated input artifact) to the original object (original input artifact 108_1) in order to verify the recreated object was recreated correctly. This can be especially effective in detecting changes in the underlying application under test 110 that will have broken the creation of artifacts 108, and it provides assurances that the testcases 104 are executed as they were originally captured.

As an aspect of one or more embodiments, the testing software 102 is configured for incremental and discrete updates to complex multi-step testcases 104. As an intrinsic benefit of testing by example as described herein, the testing software 102 is configured such that it makes it much simpler to maintain large, complex testcases 104. For example, suppose a testcase 104 spans 30 steps, and changes in the application under test 110 being tested mean that the operator now has to change step 23 of the testcase 104. The testing software 102 is configured execute the test up through step 22 in the test case, effectively recreating the context in which step 23 was originally captured. The tester can then change things (e.g., artifacts 108_1, the application under test 110, etc.) accordingly and capture (via testing software 102) just the step 23 being revised. This ability to incrementally update complex, multi-step testcases 104 is beneficial over state-of-the-art approaches. With "cinematic" testing, the fine-grained nature of the capture means that users often find it simpler to just recreate the entire testcase in the state-of-the-art. In contrast, the testing software 102 is configured to utilize steps 1-22 in the testcase 104, and then make the desired changes to step 23 of the testcase 104 without having to recreate a new testcase 104 starting from step 1-22. By the testing software 102 having the ability to incrementally update complex, multi-step testcases 104 (i.e., keep and execute steps 1-22 of the testcase 104 while updating only step 23), the incremental update of the testcase 104 provides a technique to only change the desired step 23 of the testcase 104 which is better that state-of-the-art approaches. With "cinematic" testing in the state-of-the-art, the fine-grained nature of the capture means that users face a series of tedious edits and multiple attempts until the corrected sequence of mouse- and keyboard-events is finally recorded. As a result, users often find it simpler to just recreate the entire testcase in the state-of-the-art, which compounds the very high maintenance costs of state-of-the-art approaches.

As an aspect of one or more embodiments, the testing software 102 is configured to be self-documenting of the testcases 104. The inherent ease-of-use with testing by example is complemented by the fact that testcases 104 are "self-documenting" in the sense that each testcase 104 can be fully described in a human-readable way, automatically. Information about the captured artifacts 108, 138 can be easily presented in a summary 142, along with the details of any particular steps that comprise that particular testcase 104. For example, a particularly useful presentation of the testcase 104 is a graph of the artifacts 108 and 138 that it contains and their relationships; this makes it easy to understand exactly what the test of the testcase 104 encompasses. Another example of self-documenting cases is a standalone HTML report 142 which provides an automatically generated summary of the testcase 104 and a navigable index of its contents. This is especially beneficial for complex, multi-step scenarios, where a tester can easily examine the contents of the testcase 104 to understand what it does. There is no need to understand programming (as is the case with state-of-the-art approaches), nor is there the need to write any of this documentation manually.

As an aspect of one or more embodiments, the testing software 102 is configured to allow for reuse of artifacts 108 captured in any number of testcases 104. Exemplary testing as described here provides a novel kind of reuse in which captured artifacts 108 can be referenced across any of the testcases 104. For example, suppose an application under test 110 uses configuration files. The testing software 102 is configured to capture a variety of these different configuration files as artifacts 108 and then reference them in different testcases 104. Reusing the artifacts 108 captured for one testcase 104 in other testcases 104 is a way to standardize testing and the resulting centralization means that revisions to any one or more of the captured artifacts 108 only have to be made in one place, but the revisions can apply to all of the other testcases 104.

The testing software 102 is configured to for dynamically overriding arbitrary aspects of the testcase 104. In those cases where the artifacts 108 are stored in a human-readable format, the testing software 102 supports overriding various attributes of the artifacts 108. For instance, in one implementation, the testers found that artifacts 108 would often include references to the host machine (e.g., computer system 100) on which they were captured, and these references needed to be updated dynamically during execution of the testcase 104. By including a generic override mechanism in the testing software 102, the testing software 102 is configured for testers to change any value of any artifact 108 during execution of the testcase 104. This means that artifacts 108 can be captured with as much fidelity as possible but then modified as-needed during test execution of the testcase 104 on the application under test 110. As examples of the types of useful overrides, the testing software 102 is configured with key-based overrides as well as value-based overrides of the desired artifacts 108. The value-based overrides allow testers a way of doing the equivalent of a global find-and-replace dynamically in the artifacts 108. Each artifact 108 can be or a key-value pair (KVP). The key-value pair is a set of two linked data items. In each artifact 108, the key is a unique identifier for some item of data, and the value is either the data that is identified or a pointer to the location of that data (in memory).

The testing software 102 provides the ability to edit testcases 104 to reflect minimal expectations while future-proofing the testcase 104. In those cases where the artifacts 108 reflect execution results that are human-readable, one benefit of the way in which the verification (via the testing software 102) is performed is that testers can edit the output artifacts 108 (e.g., output artifacts 108_2 and testing artifacts 138) to remove everything that is irrelevant for verification. For example, if the captured artifact 108_2 included a logfile but the tester wanted only a few lines to be used to validate testcase 104 execution, the testing software 102 is configured with an edit option such that the tester can edit that logfile (of the output artifact 108_2) to leave only those lines of interest in the output artifact 108_2 to be compared to the output artifacts 138 from the test (i.e., after execution of the testcase 104). This has the side-effect of future-proofing the testcase 104, because editing the logfile (output 108_2) to leave only those line of interest in the output artifacts 108_2 reduces the amount of verification required to the bare minimum which is appropriate for that particular test.

The testing software 102 is configured to support the intelligent correlation of artifact versions to that of the application under test 110 being tested. Versioning has been recognized as a challenge in test automation. The testing software 102 is configured to provide a mechanism by which the version of the application under test 110 can be easily and intelligently correlated to the appropriate set of testcases 104. Artifacts 108 can automatically be associated with the current version of the application under test 110 at the time of capture. In doing so, testcases 104 and the artifacts 108 the testcases 104 reference can be subject to user control as to whether the artifacts 108 are actually executed given the version of the application under test 110 to be tested. For example, this allows such things as only running tests (i.e., testcases 104) whose artifacts are associated with the current application version or earlier. For example, there can be 1-10 testcases 104, and the 1-5 testcases 104 have a version number that references an earlier version or the current version of the application under test 110 while 6-10 testcases 104 reference a later version of the application under test 110. Accordingly, for the current version of the application under test 110, the testing software 102 has user controls to allow selection of the artifacts 108 of the 1-5 testcases 104 to be tested on the current version of the application under test because the artifacts 108 of the testcases 104 each have reference to the current version and/or earlier version of the application under test 110.

In an aspect of one or more embodiments, the testing software 102 is configured to optionally store artifacts 108 and 138 in future-proofed containers 160 outside of the application under test 110 and outside of the testing software 102. By decoupling the storage of the artifacts 108 and 138 from the application under test 110, the testing software 102 stores the artifacts 108 and 138 in such a way that insulates them from changes in the application under test 110 and/or the operating system of the computer system 100. Since the testing infrastructure of the testing software 102 can "own" the format and storage of the artifacts 108 and 138, the testing software 102 is configured to perform storage in a way that ensures the contents 160 of the artifacts 108 and 138 will always be accessible. Furthermore, the testing software 102 provides mechanisms for facilitating migration and revision of the artifacts 108 and 138 outside of the application under test 110. In one implementation, testing by the testing software 102 may consist solely of versioned containers 160 of opaque objects (i.e., artifacts 108 and 138); in this case, the automation framework knows nothing about the contents except the version information associated with the application under test 110. This provides decoupling of the test automation (of the testing software 102) from the application under test 110.

As one aspect of one or more embodiments, the testing software 102 is configured with self-validation of artifacts. Self-validation allows the testing software 102 to ensure that the recreated artifacts 108_1' are equivalent to input artifacts 108_1 that were captured during the normal usage of the application under test 110. For the testing software 102 to perform the self-validation of the recreated artifacts 108_1', after recreating an artifact 108_1', the new object (artifacts 108_1') is itself captured and then compared to the original input artifacts 108_1 using the algorithm of the verification strategies application 106 to ignore expected differences 150 in transient things/items like timestamps and UUIDs. Such a comparison in the self-validation ensures fidelity in reconstituting the models (i.e., the each testcase 104 is a model) and can be implemented as an innate part of the testing software 102. The self-validation of recreated artifacts 108_1' provides confidence in the test system of the testing software 102 and the test results 138. Any discrepancies found in the comparison can be utilized to fine tune the testing software 102 to ensure that the artifacts 108 (both input artifacts 108_1 and output artifacts 108_2) are properly captured for each testcase 104. This approach gives testing software 102 a robust mechanism to guard against underlying changes in the application under test 110 or environment being tested by validating that objects are recreated correctly and successfully. If the artifact 108_1' is not correctly recreated for any reason, whether due to environment, context, or more significant issues such as API changes or something similar, self-validation allows for all of these types of errors to be detected and handled accordingly. This ability in the testing software 102 is unique to testing-by-example and is a benefit over existing state-of-the-art approaches. Furthermore, it comes at a near-zero development cost because it simply leverages the capture and recreate semantics that are already a core part of the testing software 102.

As another aspect of one or more embodiments, the testing software 102 is configured to provide self-validation of testcases 104. The above discussion provided self-validation of artifacts. Another form of self-validation is inherent to this test automation approach in the testing software 102 is self-validating testcases 104 themselves. For example, self-validation of testcases is discussed in the following scenario. A tester sets up the application under test 110 and manually runs through a test scenario. The tester looks over the system to make sure it produced the correct and expected results. Satisfied with the results, the tester now captures an executable testcase 104 from his work by running the application under test 110. Self-validation of the testcase 104 means that as the testing software 102 captures that testcase 104, the testing software 102 it quietly (e.g., without instructions or invocation by the tester) runs the testcase 104 immediately after capturing it. This is done to ensure that the test framework of the testing software 102, the application under test 110, and the testcase 104 (itself) are all working properly to thereby verify that whenever the testcase 104 is executed, the tester can have complete confidence in their test automation.

Again, it is noted that these benefits come at near-zero development cost because the self-validation of the testcase 104 is a matter of exercising the test infrastructure's existing abilities to capture, recreate, and execute testcases 104. This approach is configured to find issues without requiring explicit logic to test the testing infrastructure of the testing software 102. Instead, the approach relies on the reliable assumption that the testing software 102 can execute a testcase 104, capture its results into a new testcase, execute that new testcase, and then compare its results to those of the original execution results. Accordingly, any errors will manifest.

An aspect of one or more embodiments can include aliasing in the testing software 102. The testing software 102 include can include a robust, centralized aliasing mechanism. Capturing the artifacts 108 might result in a set of objects which reference each other in various ways, often indirectly through such things as UUIDs. There can be many objects in an artifact 108. An object is an instance of a class. A class can be defined as a template/blueprint that describes the behavior/state that the type of object supports. These identities of the objects are preserved during the original capture. However, recreating these objects of the artifacts 108 (e.g., input artifacts 108_1) could result in "clones" of the original artifacts where the new objects (recreated artifacts 108_1') have their own identities. Properly preserving the references and cross-references among these new artifacts (recreated artifacts 108_1') requires an aliasing mechanism. This aliasing mechanism in the testing software 102 can is more noteworthy when the testcase 104 spans multiple versions of the same artifacts 108. This could require the testing software to utilize a multi-level alias mechanism by which objects can be referenced by their ID, and optionally, by some notion of version. Some object references may be simply to a particular ID, such that de-aliasing those references can correctly resolve to the correct version of the object. In some cases, the testing software 102 will require keeping track of enough context so that the correct version is selected. In others case, the testing software 102 will simply require knowing which version of the artifact is the "current" one. This aliasing is generally applicable to all types of artifacts, and even those applications (i.e., application under test 110) that do not assign formal identifiers to their objects can benefit from having UUIDs generated for those objects by the testing software 102. The testing software 102 is can be implemented such that that all of this aliasing is completely independent of the application under test 110 being tested. The application under test 110 needs no knowledge of this because the aliasing is used within testing to ensure recreated artifacts reference each other correctly.

FIG. 4 is a flow chart 400 of is computer-implemented method of testing an application under test 110 using testing software 102 according to one or more embodiments. Reference can be made to FIGS. 1, 2, 3A, 3B, 3C, 3D, 3E, and 5.

At block 402, the testing software 102 is configured to create a testcase 104. Creating the testcase 104 includes executing the application under test 110 under normal usage. The normal usage is defined as operating the application under test 110 for its intended purpose, and the normal usage is not part of the testing.

At block 404, creating the testcase 104 also includes capturing artifacts 108 related to running the application under test 110 under the normal usage, where the artifacts 108 include an input artifact (e.g., input artifacts 108_1) to the application under test 110 and an output artifact (e.g., output artifacts 108_2) resulting from executing the application under test 110.

At block 406, the testing software 102 is configured to execute the testcase 104 by re-executing (as part of the test) the application under test 110 using the input artifact 108_1 (and/or recreated input artifact 108_1') previously captured in the artifacts 108 of the testcase 104 in order to obtain a new output artifact 138.

At block 408, the testing software 102 is configured to verify via the testing software 102 the new output artifact 138 resulting from execution of the testcase 104 by comparing the output artifact 108_1 previously captured in the artifacts 108 from executing the application under test 110 under normal usage to the new output artifact 138 from executing the testcase 104.

The testing software 102 is decoupled from the application under test 110. In order to execute the testcase 104 by re-executing the application under test 110, the testing software 102 is configured recreate the artifacts 108 (e.g., recreated artifacts 108_1') associated with the testcase 104, issue one or more commands to the application under test 110 to initiate behavior associated with the testcase 104, and capture the new output artifact 138.

In order to verify the new output artifact 138 resulting from execution of the testcase 104 by comparing the output artifact 108_2 previously captured in the artifacts 108 from executing the application under test 110 under normal usage to the new output artifact 138 from executing the testcase 104, the testing software 102 is configured to determine differences between the output artifact 108_2 previously captured and the new output artifact 138 while ignoring predefined differences 150. The predefined differences 150 between the output artifact and the new output artifact to be ignored comprise differences in transient items. The differences in the transient items between the output artifact 108_1 and the new output artifact 138 are selected from the group consisting of: differences in dates, differences in hostnames, differences in TCP/IP addresses, differences in universally unique identifiers (UUIDs), and differences in a number of lines in a logfile.

The testing software 102 is configured to capture multiple artifacts 108 from multiple testcases 104, re-use the multiple artifacts 108 from the multiple testcases 104 by referencing the multiple artifacts 108 across any one or more of the multiple testcases 104. The multiple testcases 104 are different from one another. The testing software 102 is configured to dynamically override a value of the artifacts 108 such that the value of the artifacts 108 (e.g., input artifacts 108_1) can be changed according to user control. The testing software 102 is configured to self-validate the artifacts 108 and is configured to self-validate the testcase 104.

Technical benefits include improved functioning of the computer itself. The testing software improves the software that is run on the computer hardware by finding bugs in the software development. The verification strategies application can be utilized to determine whether any output of the computer is functioning correctly by comparing different runs of the output. When errors are found in the comparisons, these errors in functioning of the computer (including computer software) can be fixed.

Figure 5:
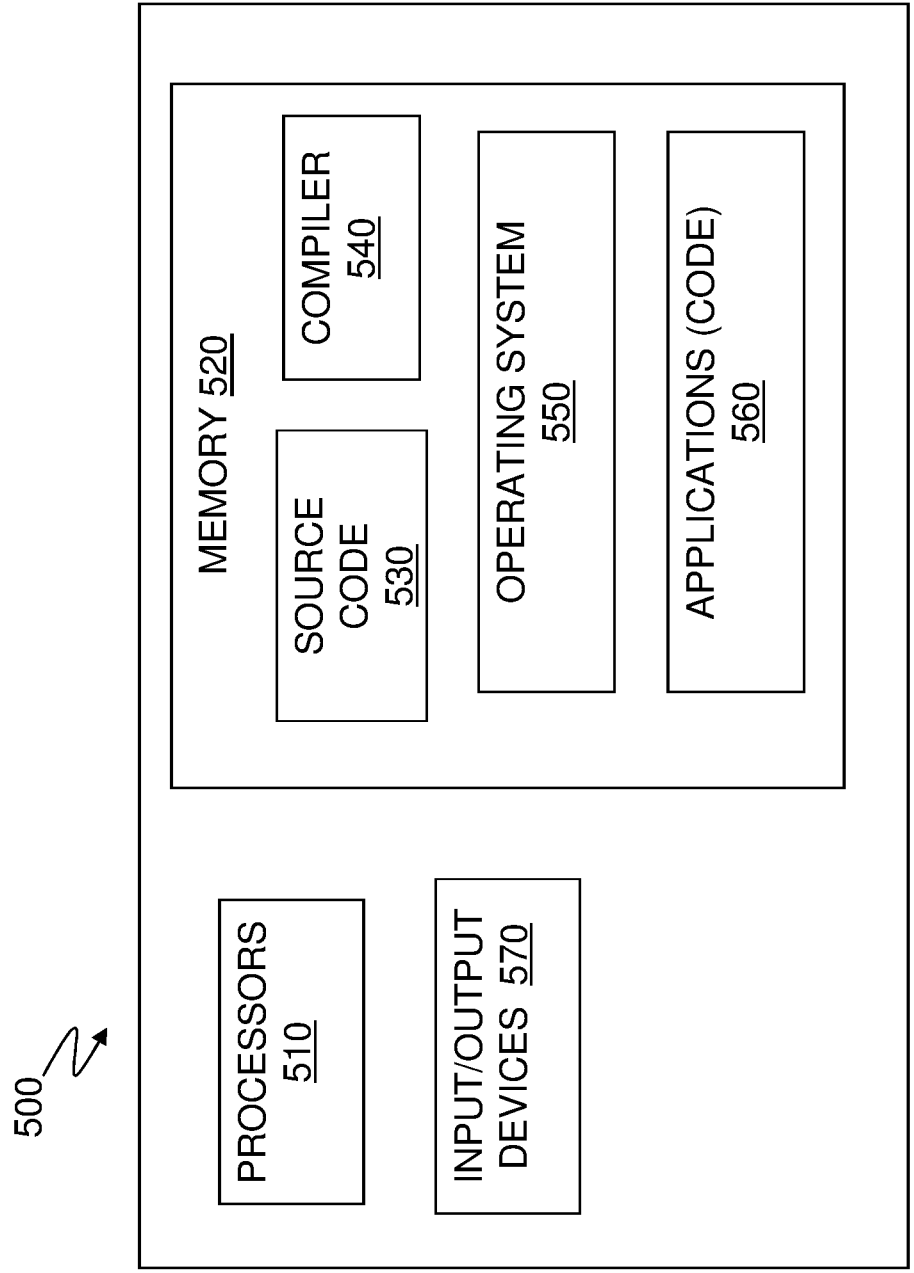
FIG. 5 is an example computer having elements that can be utilized to execute the application under test, the testing software, and the differences/verification application discussed herein according to one or more embodiments.

Now turning to FIG. 5, an example illustrates a computer 500, e.g., any type of computer system configured to execute various applications under test 110, the testing software 102, and the verification strategies application (or differences application) 106 discussed herein. The computer 500 can be a distributed computer system over more than one computer. Various methods, procedures, modules, flow diagrams, tools, applications, circuits, elements, and techniques discussed herein can also incorporate and/or utilize the capabilities of the computer 500. Indeed, capabilities of the computer 500 can be utilized to implement elements of exemplary embodiments discussed herein.

Generally, in terms of hardware architecture, the computer 500 can include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface can have additional elements, such as controllers, buffers (caches), drivers, repeaters, and receivers, to enable communications. Further, the local interface can include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 can be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 can incorporate electronic, magnetic, optical, and/or other types of storage media. Note that the memory 520 can have a distributed architecture, where various components are situated remote from one another, but can be accessed by the processor(s) 510.

The software in the computer readable memory 520 can include one or more separate programs, each of which includes an ordered listing of executable instructions for implementing logical functions. The software in the memory 520 includes a suitable operating system (O/S) 550, compiler 540, source code 530, and one or more applications 560 of the exemplary embodiments. As illustrated, the application 560 includes numerous functional components for implementing the elements, processes, methods, functions, and operations of the exemplary embodiments.

The operating system 550 can control the execution of other computer programs, and provides scheduling, input-output control, file and data management, memory management, and communication control and related services.

The application 560 can be a source program, executable program (object code), script, or any other entity comprising a set of instructions to be performed. When a source program, then the program is usually translated via a compiler (such as the compiler 540), assembler, interpreter, or the like, which can be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 can include input devices (or peripherals) such as, for example but not limited to, a mouse, keyboard, scanner, microphone, camera, etc. Furthermore, the I/O devices 570 can also include output devices (or peripherals), for example but not limited to, a printer, display, etc. Finally, the I/O devices 570 can further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 can be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for testing for bugs in a software application under test, the method comprising:
   creating a testcase from execution of a software application during normal usage in which the normal usage is not testing for bugs, the testcase comprising input artifacts and output artifacts captured from the execution of the software application during the normal usage, wherein the input artifacts comprise an input that results in the output artifacts along with associated commands and functions invoked when capturing the input to the software application during the normal usage, the software application becoming the software application under test, wherein the input artifacts further comprise one or more commands that triggered the execution of the software application during the normal usage;
   creating testing artifacts by causing a subsequent execution of the software application under test using the input artifacts from the testcase;
   comparing, by a processor, the output artifacts used to create the testcase and the testing artifacts created from using the testcase in order to find differences in the output artifacts with respect to the testing artifacts, wherein the differences are compiled in a changes map;
   analyzing, by the processor, the differences in the changes map to determine types of the differences between the output artifacts and the testing artifacts, wherein predefined differences are to be excluded; and
   generating a report of the differences, wherein the report delineates the types of the differences while excluding the predefined differences, thereby determining bugs.

2. The method of claim 1, wherein the processor is configured to find transient changes in the changes map, wherein the transient changes are recognized as the predefined differences to be excluded.

3. The method of claim 2, wherein the transient changes are defined as items that are intended to increment or decrement as an intended operation.

4. The method of claim 1, wherein items from a database are utilized for the execution of the software application during the normal usage;
   wherein the input artifacts comprise a capture of the items from the database such that the items from the database are used as part of the testcase for the subsequent execution, the database being unavailable for the subsequent execution of the software application under test.

5. The method of claim 1, wherein the processor is configured to identify a pattern of changes that are repeatedly applied.

6. The method of claim 5, wherein the processor is configured to determine that the pattern of changes is to be excluded from the report.

7. The method of claim 1, wherein the processor is configured to identify a structural change and the processor is configured to exclude the structural change from the report.

8. A computer program product for testing for bugs in a software application under test, the computer program product comprising:
   a computer readable storage medium having program instructions embodied therewith, the program instructions readable by a processor to cause the processor to perform a method comprising:
   creating a testcase from execution of the software application during normal usage in which the normal usage is not testing for bugs, the testcase comprising input artifacts and output artifacts captured from the execution of the software application during the normal usage, wherein the input artifacts comprise an input that results in the output artifacts along with associated commands and functions invoked when capturing the input to the software application during the normal usage, the software application becoming the software application under test, wherein the input artifacts further comprise one or more commands that triggered the execution of the software application during the normal usage;
   creating testing artifacts by causing a subsequent execution of the software application under test using the input artifacts from the testcase;
   comparing the output artifacts used to create the testcase and the testing artifacts created from using the testcase in order to find differences in the output artifacts with respect to the testing artifacts, wherein the differences are compiled in a changes map;
   analyzing the differences in the changes map to determine types of the differences between the output artifacts and the testing artifacts, wherein predefined differences are to be excluded; and
   generating a report of the differences, wherein the report delineates the types of the differences while excluding the predefined differences, thereby determining bugs.

9. The computer program product of claim 8, wherein the processor is configured to find transient changes in the changes map, wherein the transient changes are recognized as the predefined differences to be excluded.

10. The computer program product of claim 9, wherein the transient changes are defined as items that are intended to increment or decrement as an intended operation.

11. The computer program product of claim 9, wherein the transient changes are selected from the group consisting of differences in dates, differences in hostnames, differences in TCP/IP addresses, differences in universally unique identifiers (UUIDs), and differences in a number of lines in a logfile.

12. The computer program product of claim 8, wherein the processor is configured to identify a pattern of changes that are repeatedly applied.

13. The computer program product of claim 12, wherein the processor is configured to determine that the pattern of changes is to be excluded from the report.

14. The computer program product of claim 8, wherein the processor is configured to identify a structural change and the processor is configured to exclude the structural change from the report.

15. A system comprising:
memory including computer-executable instructions for testing for bugs in a software application under test; and
a processor executing the computer-executable instructions, the computer-executable instructions causing the processor to perform operations comprising:
creating a testcase from execution of the software application during normal usage in which the normal usage is not testing for bugs, the testcase comprising input artifacts and output artifacts captured from the execution of the software application during the normal usage, wherein the input artifacts comprise an input that results in the output artifacts along with associated commands and functions invoked when capturing the input to the software application during the normal usage, the software application becoming the software application under test, wherein the input artifacts further comprise one or more commands that triggered the execution of the software application during the normal usage;
creating testing artifacts by causing a subsequent execution of the software application under test using the input artifacts from the testcase;
comparing the output artifacts used to create the testcase and the testing artifacts created from using the testcase in order to find differences in the output artifacts with respect to the testing artifacts, wherein the differences are compiled in a changes map;
analyzing the differences in the changes map to determine types of the differences between the output artifacts and the testing artifacts, wherein predefined differences are to be excluded; and
generating a report of the differences, wherein the report delineates the types of the differences while excluding the predefined differences, thereby determining bugs.

16. The system of claim 15, wherein the processor is configured to find transient changes in the changes map, wherein the transient changes are recognized as the predefined differences to be excluded.

17. The system of claim 16, wherein the transient changes are defined as items that are intended to increment or decrement as an intended operation.

18. The system of claim 16, wherein the transient changes are differences in a number of lines in a logfile.

19. The system of claim 15, wherein the processor is configured to identify a pattern of changes that are repeatedly applied.

20. The system of claim 19, wherein the processor is configured to determine that the pattern of changes is to be excluded from the report.

* * * * *